United States Patent [19]
Jürgen Bräuninger

[11] Patent Number: 5,031,177
[45] Date of Patent: Jul. 9, 1991

[54] METHOD FOR CONTROLLING A COMPUTER-FINAL CONTROL ELEMENT AND COMPUTER COUPLED WITH A FINAL CONTROL ELEMENT

[75] Inventor: Jürgen Bräuninger, Stuttgart, Fed. Rep. of Germany

[73] Assignee: Robert Bosch GmbH, Stuttgart, Fed. Rep. of Germany

[21] Appl. No.: 392,927

[22] PCT Filed:

[30] Foreign Application Priority Data

Jan. 22, 1987 [DE] Fed. Rep. of Germany ....... 3701699

[51] Int. Cl.5 ............................................. G06F 11/00

[52] U.S. Cl. ................................. 371/16.1; 371/16.4; 364/431.11; 364/580

[58] Field of Search .................... 371/16.4, 16.3, 16.1, 371/18, 16.5, 29.1; 364/431.1, 431.11, 431.09, 186, 580, 579

[56] References Cited

U.S. PATENT DOCUMENTS

| | | | |
|---|---|---|---|
| 4,310,888 | 1/1982 | Furuhashi | 364/431.1 |
| 4,409,635 | 10/1983 | Kraus | 371/16.1 X |
| 4,456,831 | 6/1984 | Kanegae | 290/38 R |
| 4,541,050 | 9/1985 | Honda | 364/424 |
| 4,649,537 | 3/1987 | Rosswurm | 371/16.1 |
| 4,726,024 | 2/1988 | Guziak | 371/16.1 |

FOREIGN PATENT DOCUMENTS

| | | |
|---|---|---|
| 212682 | 3/1987 | European Pat. Off. . |
| 3229411 | 3/1983 | Fed. Rep. of Germany . |
| 8440 | 1/1986 | Japan . |
| 2050644 | 1/1981 | United Kingdom . |

*Primary Examiner*—Jerry Smith
*Assistant Examiner*—Robert W. Beausoliel
*Attorney, Agent, or Firm*—Michael J. Striker

[57] ABSTRACT

In a method for controlling a computer-controlled fuel injection final control element in connection with a self-test of the computer, the final control element is locked in a defined reference position only during a first period of the self-test and is subsequently controlled with preliminary control signals until the end of a second period of the self-test or until an error report occurs.

12 Claims, 3 Drawing Sheets

METHOD FOR CONTROLLING A COMPUTER-FINAL CONTROL ELEMENT AND COMPUTER COUPLED WITH A FINAL CONTROL ELEMENT

The invention is directed to a method for controlling a computer-controlled final full injection control element during a self-test of the computer.

Computer-controlled final control elements are used in many areas of technology where the manipulated variable depends on numerous other marginal conditions, including reference variables and controlled variables.

Computers are required to have a high computing speed and the ability to process extensive data records reliably. This requires a high memory requirement on the part of the computer.

Although the failure rate of computer systems has been successfully reduced to an increasing degree in spite of increasing complexity, the possibility of a circuit technology related error must still be taken in account. While circuit technology related errors were, as a rule, immediately recognizable in formerly conventional analog circuits, this is often not the case with errors in digital computer systems. In the latter, an error, e.g. in a memory location for a program routine which is seldom called, can remain undetected for a longer period of time and can then occur in a completely surprising manner. This can result in control commands which trigger considerable consequential damages.

In order to recognize such errors at an early stage, it is conventional in complex safety related computer-controlled final control elements to subject the computer to a self-test from time to time. In so doing, a test program is run through in which all components are actuated one after the other with predetermined data and a main program is started after the termination of the self-test only when the data is correctly processed. In complex computer systems, such a self-test claims a certain period of time during which the computer is not available for exercising its actual task. In order to avoid an unmonitored controlling of the final control element during this time, it is kept in a defined reference position and only released again, or for the first time, for control signals of the computer after the execution of the self-test.

An area of application for computer-controlled final control elements is e.g. an electronic diesel injection for diesel engines. For this purpose, the computer-controlled final control element is arranged in a control device which actuates the control rod for an injection apparatus. The required position of the control rod can be a function of the engine temperature, the fuel temperature, the air temperature, the torque and the speed.

The self-test of the computer is advisably carried out at the beginning of every starting process. However, it has become apparent that the time required for this can have disadvantageous consequences. Thus, the long starting process can cause impatient drivers to become uncertain and can invite the assumption that there is a problem. Drivers who are already familiar with the starting process will be less ready to turn off the engine for reasons relating to environmental loading in order to avoid the delay time in backed-up traffic, at traffic lights or stops at railroad crossings. During frequent short-distance trips, a high loading of the starter and battery also occurs. When extreme cold or a weak starter battery are added to this, the long self-test can result in that the energy supplied by the battery for starting the engine is prematurely exhausted.

In other areas as well, long self-test times can have disadvantageous consequences, e.g. in computer-controlled final control elements in production plants or in drive technology of track-bound public means of transportation, watercraft or aircraft.

The invention has the object of improving a method for controlling a computer-controlled final control element in such a way that the disadvantageous consequences of a long self-test for the control of a final control element are avoided without limiting the security achieved by means of the self-test.

This object is met in a method wherein the control element is first locked in a defined reference position during the self-test and is released for control signals of the computer after the self-test has been completed. In an embodiment, the final control element is locked only during a first period of the self-test and is subsequently controlled with preliminary control signals from a signal generator until the end of a second period of the self-test or until an error message has occurred.

The invention utilizes the understanding that the self-test of a computer-controlled final control element is passed on all points, so that the time required for the self-test is to be viewed as wasted in retrospect. In order to shorten this time period, the final control element is controlled with a preliminary signal. This can be selected in such a way, for example, that the final control element ensures a temporary functioning of the unit actuated by it. Because of the shortness of time in which the preliminary control signal is applied, it can be assumed that this value deviates more or less from an optimum value. However, so as not to suffer any impairment of safety in these steps, the component parts of the computer which are themselves responsible for carrying out the test are subjected to the self-test in a first time period. The final control element is then controlled with the preliminary control signal only after this first period of the self-test has been concluded.

By means of this step, it is also ensured that the subsequent second period of the self-test can be carried out in a monitored manner and the preliminary control signal can be turned off again when an error is reported. With this step a considerable shortening of the delay time for a controlling of the final control element can be achieved, since the time required for the testing of the memory location required for the self-test and the time required for testing the respective components is substantially shorter than the time for testing the entire remaining program memory. In practice, a reduction of the delay time until the first controlling of the final control element by 1/10 to 1/30 of the time required for the entire self-test is achieved with the method according to the invention.

Developments and advantageous embodiment forms of the method, according to the invention a final control element for controlling fuel injections in a diesel engine wherein the defined reference position corresponds to a zero fuel amount and the fuel amount adjusted in response to the precedent control signal is used as a starting amount to be injected.

The invention is directed, in addition, to a device including a self-testing computer coupled with a final control element and with a signal generator for delivering the preliminary control signals.

In this respect, it has the object of improving a computer coupled with a final control element of the type named in the beginning in such a way that the disadvantageous consequences of a delayed release of the final control element for control signals of the computer are avoided without limiting the security achieved by means of the self-test.

The invention meets this object in a computer coupled with a final control element according to the preamble of claim 12 with features indicated in the characterizing part.

By means of this construction, the final control element can be controlled with a preliminary control signal already before the conclusion of the self-test. The time until the release of the final control element for control signals of the computer can accordingly be bridged. The control signal can be freely selected, in principle. It is advisably selected in such a way that it temporarily ensures the functioning ability of the unit actuated by the final control element. This step is not connected with any impairment of security, since the self-test can be continued after controlling the final control element with the preliminary control signal and, in the event of an error, the final control element can be switched again in such a way that it occupies the defined reference position.

The invention is explained in the following with the aid of embodiment examples shown in the drawing.

Figure 1:
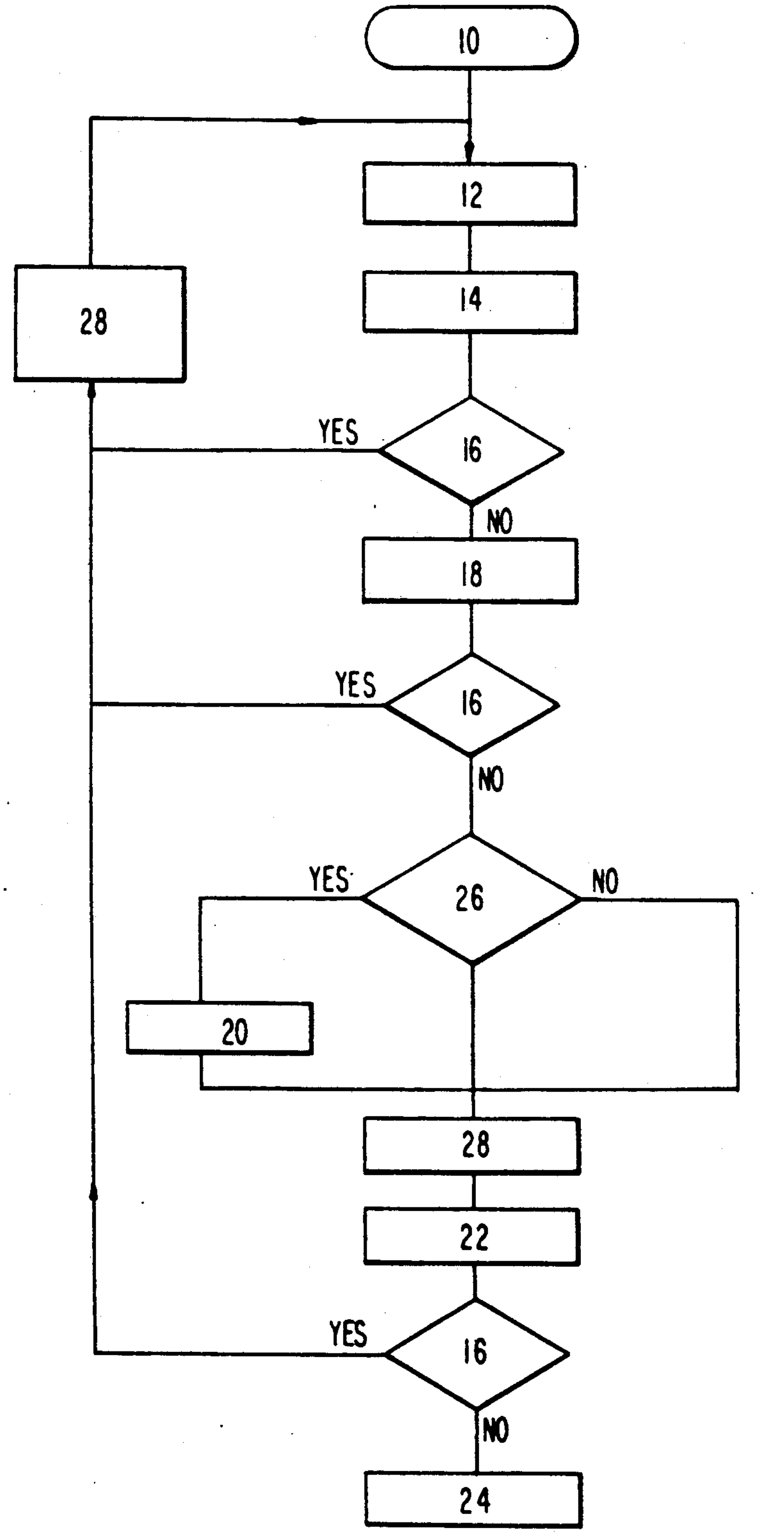
FIG. 1 shows a flow diagram for the execution of a self-test in a computer-controlled final control element as component part of a control device for an electronic diesel injection in a diesel engine.

The flow diagram in FIG. 1 begins in an initial state 10 of the computer in which the latter was placed e.g. by means of a reset command after the application of operating voltage. In the next method step, which is designated by 12, the final control element is brought into a defined reference position and kept there. This position corresponds to a zero quantity of diesel fuel. During this phase, the starter cranks the engine without the latter being able to start. In a subsequent method step, which is designated by 14, a self-test routine of a first portion of the program memory is run through. In so doing, the memory locations of the memory of the computer in which the program part of the self-test program is stored are tested with respect to function.

Such a memory test can be carried out e.g. in such a way that the entire program memory is summed and compared with a comparison sum, or the comparison sum is adopted in a program memory cell and selected in such a way that zero results in the summing of the entire program memory content.

Subsequently, in a method step designated by 16, a comparison is carried out for errors. If an error is determined, the computer is put back into its initial state again, which is designated by 10. If no error is determined, the method step designated by 18 is carried out. This is a function test of other component parts of the computer, e.g. a write-read memory, a timer, or an analog-to-digital converter. After this test is concluded, a testing for errors is carried out again at 16. In the case of error, a reset command is issued which puts the computer back into its initial state 10 again; if no error is determined the next method step follows.

The implementation of method steps 12, 14, 16, 18 and again 16 in the form of predetermined self-test routines corresponds to a first period of the self-test. In the following method step 20, the final control element is now controlled with a preliminary control signal. This corresponds in the application example to a starting quantity of diesel which is sufficient for starting the engine reliably. While the engine is already running, a second period of the self-test is carried out. This is substantially more time-consuming than the previous self-test carried out in the first period. In the second period of the self-test, a program routine is run through in which the rest of the program memories are checked for functioning. This is shown by means of the method step 22. After the conclusion of this method step, an error check is effected again, as symbolized by means of 16. In the case of error, the computer is reset to its initial state; if there is no error the final control element is released for control signals of the computer in that the computer passes into the main program. This is symbolized by 24. The second period of the self-test is terminated at the successful outcome of the test to be carried out at 16.

In a modification of the shown flow diagram, the second period of the self-test can also be effected after conclusion of the test 16 following the method step 14, and the method step 18 can be assigned to the second period of the self-test. In this case, the method step 20, by means of which the final control element is controlled with a preliminary control signal, would have to be shifted up.

In another modification, the computer can be set to a different state than the initial state during error reports which first occur after a plurality of self-test routines have run through without error. In so doing, it is advisable to select a state which corresponds to the last self-test period without errors.

Since the engine is cranked by the starter during the first period of the self-test, error reports can come about as a result of voltage breakdowns without the latter being caused by damage to the computer. In this case, the method according to the modified construction prevents the repeating of test routines which have already been carried out successfully and accordingly prevents time being wasted. Of course, this construction also requires special control steps which in turn necessitate program memory locations. Based on the consideration that such errors seldom occur anyway, the general resetting of the computer to the initial state is therefore not viewed as disadvantageous.

In a further development of the invention, with the resetting of the computer based on newly applied operating voltage this fact is stored as a switching state. This storage is effected e.g. in method step 12. In this case, a comparison 26, in which the switching state is evaluated as a switching criterion, is switched ahead of the preliminary controlling of the final control element in method step 20. Subsequently, the memory is erased in a method step 28. The memory is also erased when an error has occurred already before reaching the comparison 26.

If it is determined in the comparison 26 that the self-test routines have run through successfully immediately after a first application of the operating voltage, the method step 20 is subsequently carried out. If this is not the case, the method step 20 is not carried out. Thus, as a result of a resetting of the computer to the initial state because of an error report, the final control element is kept in the defined reference position during the following self-test routines. With reference to the application example, this means that the engine obtains zero quantity until the termination of the entire self-test.

This step prevents a loop from being run through in which the final control element is controlled over and over again with the preliminary control signal due to recurring error reports in the second period of the self-test. In the application example this would result in that the engine is injected with starting quantities of diesel in a cyclical manner. Since the starting quantity is substantially greater than the idling quantity, this would result in a racing and overspeeding of the engine, which can lead to considerable damages. Thus, in this case, the safety aspect has priority over a shortening of time for the control of the final control element with control signals.

A monitoring circuit (watchdog) is often provided so that the security of a computer-controlled final control element can also be monitored in running operation. This checks e.g. computing routines or synchronous pulses and triggers a resetting command when such signals are absent. The computer is accordingly prevented from being placed in a state which it can no longer leave by itself because of an external interference, e.g. voltage breakdown, voltage peaks or electromagnetic disturbances.

Figure 2:
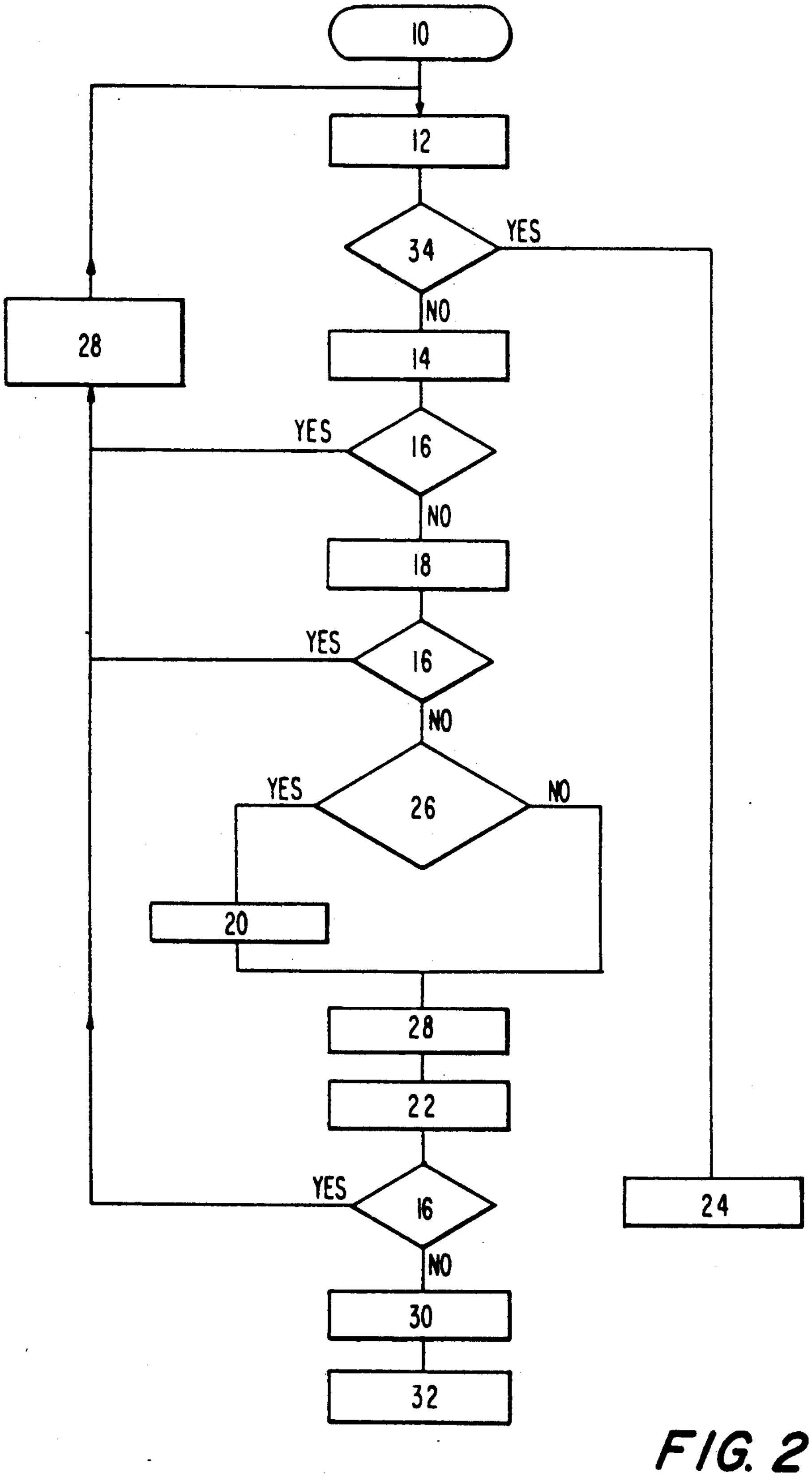
FIG. 2 shows a flow diagram similar to FIG. 1, but additionally for the execution of a self-test for a monitoring circuit.

If the monitoring circuit is to be included in the self-test, the process according to a flow diagram according to FIG. 2, for example, can be effected. In so doing, the computer is programmed in such a way that it omits a computing routine, provided per se, or a synchronous signal, so that the monitoring circuit causes a resetting command.

Figure 3:
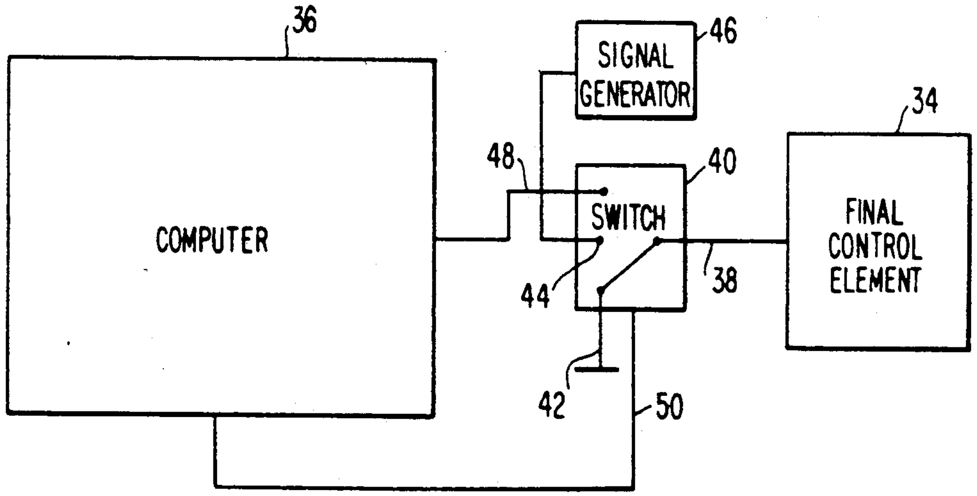
FIG. 3 shows a block wiring diagram of a computer-controlled final control element, according to the invention.

In this event, a comparison 34 is carried out between the method steps 12 and 14 in that a check is made as to whether or not a resetting command has taken place by means of the monitoring circuit. If this is the case, the computer passes into the main program 24, i.e. the final control element is released for control commands of the computer. However, this comparison is first carried out after all remaining self-test periods have been successfully run through. The method steps are run through in the same sequence as was described in FIG. 1. If the self-test of the first and second periods was free of errors, the final control element is first brought into the defined reference position temporarily and kept there, again in a method step 30. This corresponds to the delivery of zero quantity of diesel. In a following method step 32, the occurrence of a resetting command which must be triggered by the monitoring circuit is waited for. After running through the method step 12 toward such a resetting command, a check is carried out at 34 as to whether or not the resetting command has taken place by means of the monitoring circuit and whether or not the computer has passed into the main program 24. In conclusion, an embodiment example of a computer-controlled final control element is explained which is shown as a block wiring diagram in FIG. 3.

It comprises a final control element 34 for actuating a control rod of an electronic diesel injection and a computer 36. A switch 40 is included in a control line 38 of the final control element 34, which switch 40 is switched by the computer 36 via a control line 50 and can occupy three states.

As long as no switching signal is applied to the switch 40, it is found in the position shown in the drawing. In this position, it lies at reference potential 42, which corresponds to a fixing at a defined reference position. If the test routines of a first period have been passed and if the initial state proceeding from which the computer has begun the self-test has been caused by means of first-time application of the operating voltage, the switch 40 is switched into the second position. In this position, the final control element 34 is connected via a line 44 with a generator 46 which produces a preliminary control signal. In the application example, this corresponds to a starting quantity of diesel. It is only when the computer has successfully run through all periods of the self-test that the switch 40 reaches the third position in which the final control element 34 is released for control signals of the computer 36 which it obtains via a control line 48.

The method, according to the invention, and the computer coupled with a final control element thus enables a considerable shortening of the triggering of the final control element 34 by means of the self-test. The remaining time in which no injection of diesel is effected in the application example corresponds approximately to the time required by the starter to accelerate the engine to starting speed. After the engine is started, the rest of the self-test can then be carried out without potential disturbances due to voltage breakdowns brought about by the starter. In the course of this further self-test, possibly occurring errors lead immediately to a switching off of the preliminary control signal, that is, the starting quantity of diesel. As a result of this, safety is not impaired.

In the application example of the diesel engine, the steps achieved with the invention also help the immediate starting behavior of the engine to encourage the driver to turn off the engine during short stops and thus to contribute to reducing environmental loading. In addition, the life of the starter is increased, the battery is discharged, particularly during short trips, and the starting of the engine is made possible also when the battery is weak.

I claim:

1. Method of controlling a computer-controlled final control element during a self-test of the computer, wherein the final control element is responsive to control signals to assume positions corresponding to different fuel amounts, said method comprising the steps of fixedly locking the final control element in a defined reference position during a first period of the self-test; subsequently controlling the final control element with preliminary control signals from a signal generator during a second period of the self-test until one of an end of a second period of the self-test and an error report occurring during the second period; and releasing the final control element for control signals of the computer after the self-test has been passed.

2. Method according to claim 1, characterized in that in the first period of the self-test test routines for checking a stored program part for the self-test are executed.

3. Method according to claim 2, characterized in that in the first period of the self-test in addition to the test routines for checking the stored part for the self-test program components of the computer are tested.

4. Method according to claim 3, characterized in that in the second period of the self-test test routines for checking a remaining stored program part are executed.

5. Method according to one of claims 1–4, characterized in that the self-test is repeated during an error report starting from an initial state of the computer from which the self-test was begun and is subsequently continued in the absence of errors, and in that the final control element is locked in the defined reference position during the entire repeated and continued self-test.

6. Method according to claim 5, wherein the computer is placed in the initial state starting from which the self-test is begun by means of every new application of operating voltage, characterized in that the new application of the operating voltage is stored as a switching state and is evaluated as a switching criterion for the preliminary control signal after the first period of the self-test is executed without errors, and in that after controlling the final control element with the preliminary control signal, or after an error report, the memory is erased for the switching state of the new application of the operating voltage.

7. Method according to one of claims 1 - 4, characterized in that the self-test is repeated during an error report starting from a last test routine which is free of errors and is continued in the absence, of errors, and in that the final control element is locked in the defined reference position during the entire repeated and continued self-test.

8. Method according to claim 3, characterized in that a third period of the self-test is formed from a test routine of a monitoring circuit (watchdog), in which the final control element is kept in the defined reference position again, and in that the final control element is released for control signals of the computer only after the test of the monitoring circuit is passed.

9. Method according to claim 1, characterized in that the control signals are released when the computer passes from a self-test program into a main program.

10. Method according to claim 9, characterized in that the control signals are released after the computer passes from a test program via a resetting process into the initial state into a main program.

11. A method according to claim 1 for adjusting electronically controlled fuel injections in a diesel engine having a final control element responsive to control signals to assume positions corresponding to different fuel amounts, comprising the steps of defining a reference position of the control element corresponding to a zero setting of the fuel amount, and using a fuel amount corresponding to a position adjusted by a precedent control signal as a starting amount to be injected into the diesel engine.

12. A device for adjusting computer-controlled fuel injections in a diesel engine, said device comprising a final control element responsive to control signals to assume positions corresponding to different fuel quantities; a control signal generator for generating preliminary control signals for said final control element; and a computer for delivering the control signals in response to which said final control element assumes positions corresponding to different fuel amounts, for delivering a reference signal for setting said control element into a defined reference position in which the control element is non-responsive to the control signals of the computer, and for delivering a preliminary control signal for setting the final control element during a self-test of the computer into a third position in which said control element is responsive to the preliminary control signals from said control signal generator.

* * * * *